United States Patent
Buchko (10) Patent No.: US 9,515,943 B2
(45) Date of Patent: Dec. 6, 2016

(54) TOPIC DISCARD INDICATION

(71) Applicant: SOLACE SYSTEMS, INC., Kanata (CA)

(72) Inventor: Steve Buchko, Dunrobin, CA (US)

(73) Assignee: SOLACE SYSTEMS, INC., Ottawa, ON (CA)

(*) Notice: Subject to any disclaimer, the term of this patent is extended or adjusted under 35 U.S.C. 154(b) by 374 days.

(21) Appl. No.: 13/754,939

(22) Filed: Jan. 31, 2013

(65) Prior Publication Data
US 2014/0214977 A1    Jul. 31, 2014

(51) Int. Cl.
| | | |
|---|---|---|
| G06F 15/16 | (2006.01) | |
| H04L 12/823 | (2013.01) | |
| H04L 12/815 | (2013.01) | |
| H04L 12/58 | (2006.01) | |
| H04L 12/18 | (2006.01) | |

(52) U.S. Cl.
CPC .......... H04L 47/32 (2013.01); H04L 12/1859 (2013.01); H04L 12/1868 (2013.01); H04L 47/22 (2013.01); H04L 51/30 (2013.01)

(58) Field of Classification Search
CPC ................................ H04L 47/22; H04L 47/32
USPC .......................... 370/235, 352; 709/206, 207
See application file for complete search history.

(56) References Cited

U.S. PATENT DOCUMENTS

| | | | |
|---|---|---|---|
| 6,363,412 B1* | 3/2002 | Niwa | H04L 12/5895 370/310.1 |
| 2004/0034640 A1* | 2/2004 | Jain | G06F 17/30289 |
| 2004/0249900 A1* | 12/2004 | Karstens | H04L 12/581 709/207 |
| 2005/0021622 A1* | 1/2005 | Cullen | G06Q 30/02 709/204 |
| 2005/0096928 A1* | 5/2005 | Ruggaber | H04L 12/18 709/220 |
| 2007/0011163 A1* | 1/2007 | Banks | G06F 9/546 |
| 2007/0293240 A1* | 12/2007 | Drennan | H04L 12/189 455/456.1 |
| 2008/0134202 A1* | 6/2008 | Craggs | G06F 9/542 719/313 |
| 2008/0170563 A1* | 7/2008 | Zhu | H04L 29/06027 370/352 |
| 2008/0294738 A1* | 11/2008 | Pastorelli | H04L 51/063 709/206 |
| 2012/0207159 A1* | 8/2012 | Buchko | H04L 45/16 370/390 |
| 2013/0148504 A1* | 6/2013 | Ungureanu | H04L 47/17 370/235 |

* cited by examiner

*Primary Examiner* — Imad Hussain
(74) *Attorney, Agent, or Firm* — Marks & Clerk; Richard J. Mitchell (57) ABSTRACT

In a message delivery system wherein messages having topic portion defining a topic and a body portion containing information relating to the defined topic are delivered to subscribers based on the topics associated with the messages, the messages are placed in a queue for delivery, and in the event of congestion one or more of the messages are replaced with discard indication messages containing the topics associated with the discarded messages without the corresponding body portions.

13 Claims, 5 Drawing Sheets

TOPIC DISCARD INDICATION

FIELD OF THE INVENTION

This invention relates to data communication networks and in particular methods of notifying subscribers of message loss in message delivery systems.

BACKGROUND OF THE INVENTION

In the prior art, many message delivery systems exist which route messages between endpoints, such as between different applications. The messages may be routed to destination endpoints based on topics or topic to queue mappings. In the case of a system that routes messages based on topics an example of which is described in U.S. Pat. No. 13/357,951, the contents of which are herein incorporated by reference, there are publishing (or producing) clients that generate messages and subscribing (or consuming) clients that receive messages. When a publishing client creates a message it adds to it a topic. Destination endpoints are created by subscribing clients that have associated with them a series of subscriptions (or interests) that are used to attract messages to the subscribing application. Alternately subscriptions may be used to attract messages to a queue endpoint which one or more applications can connect to and receive messages. The topics are typically text strings that often contain sub-fields also known as hierarchical levels but, may also be numbers. Interests or subscriptions are of a similar form to the topics but, may contain regular expressions (also known as wild cards) or if the topics are in the form of numbers, the interests could be in the form of a range of numbers. The interests are gathered by the message delivery system and are used to determine which destination endpoint(s) should receive a copy of a particular message received from a publishing application in a process called matching. In the topic based message delivery system the process of matching involves comparing the topics of messages received from publishing clients to the interests gathered from subscribing clients or queues. A match to an interest is generated when the topic of the incoming messages falls within the regular expression(s) contained in the interest.

In a reliable message delivery system a component may become congested and find it necessary to discard one or more messages due to a lack of resources or because a queue depth exceeded a configured threshold. Prior art message delivery systems that use a brokered topology to set a discard indication flag in the message header to indicate that preceding messages were discarded. However, in this prior art there is only an indication that one or more messages were discarded without providing the topics of the discarded messages. In the case of the brokered topology, prior art systems do not scale to message delivery networks that consist of more than a single message broker (also known as a message delivery router) and do not indicate the exact topic of discarded message(s) if the subscriber interest contains a wildcard or if the subscriber endpoint has associated with it more than a single interest. In other prior art message delivery systems that use a brokerless topology subscribing clients can request a retransmission from source if a lost message is detected. If the source of the message is unable to fulfill the retransmission request, it will broadcast a dataloss advisory message to all clients. The dataloss advisory message used in the prior art brokerless messaging system contains only the identification of the source client and does not contain the topics of the messages that were lost. The dataloss advisory message must be broadcast to all clients of the brokerless message delivery system because the sender is unaware of what clients exist that may be interested in receiving the lost messages.

SUMMARY OF THE INVENTION

According to the present invention there is provided a method of managing congestion in a message delivery system wherein messages containing a topic portion defining a topic and a body portion containing information relating to the defined topic are delivered to subscribers based on the topics associated with the messages, comprising placing the messages in a queue for delivery; in the event of congestion in the message delivery system, discarding one or more of said messages in the queue; and replacing the discarded messages with one or more discard indication messages containing the topics associated with discarded messages without the corresponding body portions.

In one embodiment the discard indication messages contain only the topic portion of the original messages without the body portion, although the discard indication messages could contain the topic identified in a different manner.

The discard indication messages may also contain a field indicating the number of messages relating to a topic that have been discarded. For example, if four messages on a particular topic are discarded from the same queue, they could all be replaced by a discard indication message containing the topic and an indication that four messages have been discarded.

The discard indication messages typically have a flag set to indicate that they are unavailable for discard.

In another aspect the invention provides a router for use in a message delivery system wherein messages contain a topic portion defining a topic and a body portion containing information relating to the defined topic are delivered to subscribers based on the topics associated with the messages, comprising a queue for enqueing received messages for delivery; and a processor configured, in the event of congestion in the message delivery system, to: discard one or more of said messages in the queue; and replace the discarded messages with one or more discard indication messages containing the topics associated with discarded messages without the corresponding body portions of the messages.

It will be appreciated that the router could be implemented as a piece of specific hardware or alternatively as a software implementation on a generic server platform.

In yet a further aspect the invention provides storage medium storing instructions for managing congestion in a message delivery system wherein messages containing a topic portion defining a topic and a body portion containing information relating to the defined topic are placed in a queue for delivery to subscribers based on the topics associated with the messages, said instructions when executed on the processor and in the event of congestion in the message delivery system causing the processor to: discard one or more of said messages in the queue; and replace the discarded messages with one or more discard indication messages containing the topics associated with discarded messages without the corresponding body portions of the messages.

BRIEF DESCRIPTION OF THE DRAWINGS

The invention will now be described in more detail, by way of example, with reference to the accompanying drawings, in which.

DETAILED DESCRIPTION OF THE PREFERRED EMBODIMENTS

Figure 1:
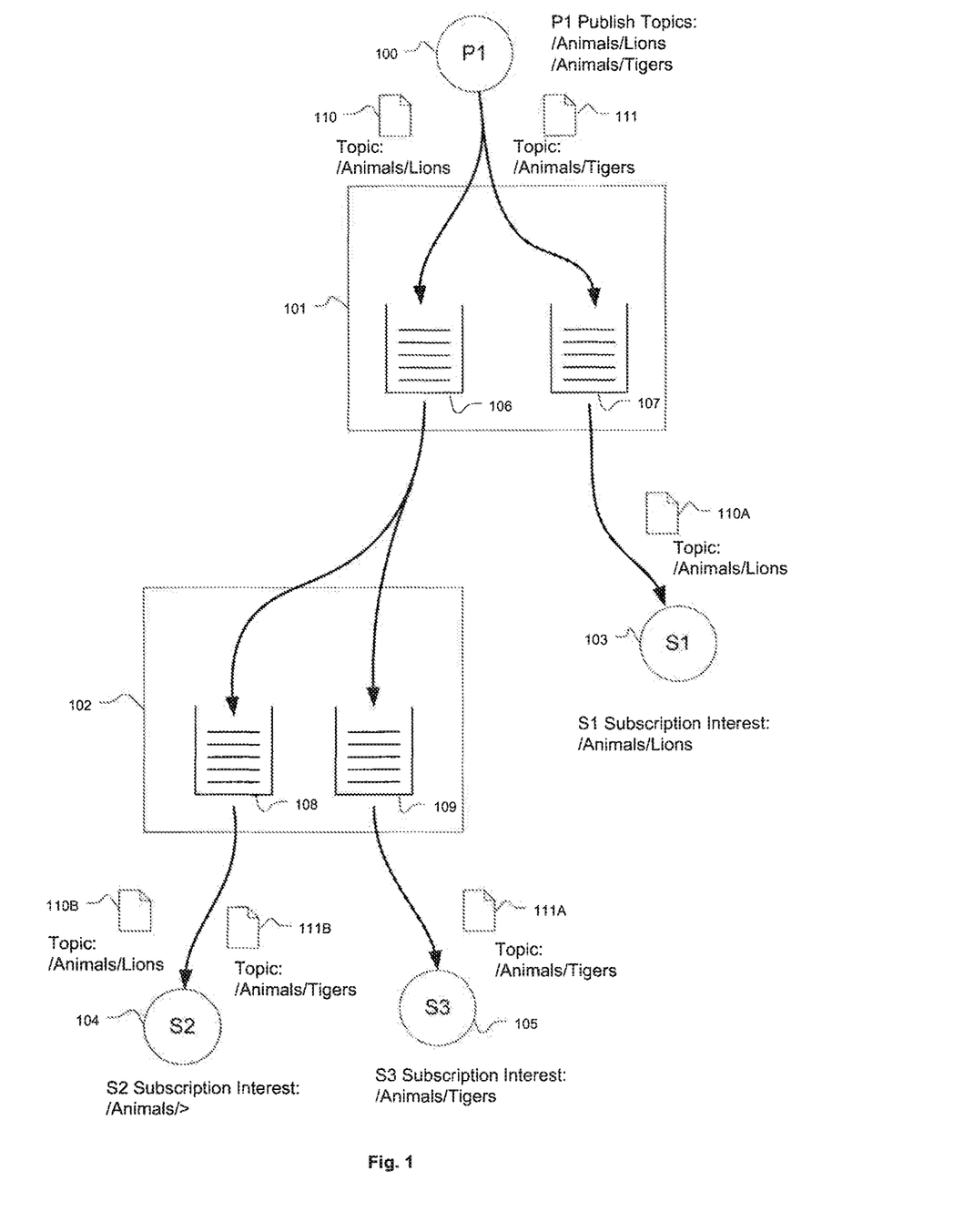
FIG. 1 shows an example message delivery system.

FIG. 1 shows an example message delivery system consisting of two message delivery routers 101 and 102 that are networked such that messages published to the upstream message delivery router 101 may be received by subscribers connected to a second downstream message delivery router 102. Publishing client P1 100 and subscribing client S1 103 are connected to message delivery router 101 while message delivery router 102 has two connected subscribing clients S2 104 and S3 105.

Publishing client P1 100 is publishing messages 110 and 111 to two topics, /Animals/Lions and /Animals/Tigers respectively. Subscribing client S1 103 has indicated to message delivery router 101 that it is interested in receiving a copy of any messages that have a topic of /Animals/Lions. There are two other subscribers S2 104 and S3 105 connected to the network depicted in FIG. 1. Subscriber S2 104 has registered an interest in receiving messages that match the subscription/Animals/>; the ">" character in this case is a wild card that will match any topic with "Animals" at the first level in the topic so S2's interest will match messages with topics /Animals/Lions and /Animals/Tigers. Subscriber S3 105 has registered an interest in receiving messages that match the subscription /Animals/Tigers. In order for message delivery routers 101 and 102 to function as a network, upstream message delivery router 101 will have to have some knowledge of the subscription interests of the clients attached to downstream message delivery router 102. The subscription interests of all the subscribing clients 103-105 could be manually configured on each message delivery router 101-102 or could be propagated as the subscribing clients 103-105 add them by a dynamic routing protocol such as described in US Patent Application Pub. No. US 2012/0207159 A1 published Aug. 16, 2012, the contents of which are herein included by reference.

Upon receiving a message 110, 111 from publishing client P1 100, message delivery router 101 will extract the topic of the message and attempt to match the topic to interests of subscribing clients 103-105 connected to the network. In the case of message 110 the topic is /Animals/Lions and that matches subscription interests from subscribing clients S1 103 and S2 104. Subscribing client S1 103 is locally attached to message delivery router 101 and a copy of the message 110A will be placed in queue 107 to be delivered to client S1 103. The topic /Animals/Lions also matches a subscription interest for subscribing client S2 104. Subscribing client S2 104 is not directly connected to message delivery router 101 and a copy of the message 110 will be placed in queue 106 along with other messages to be delivered to subscribing clients S2 104 and S3 105 that are connected to the downstream message delivery router 102. When message delivery router 102 receives a message from queue 106 it must perform its own matching process to determine the locally attached subscribing clients with interests that match the topic of the message. In the case of message 110 with a topic of /Animals/Lions, the message delivery router 102 will detect a matching interest for subscribing client S2 104 and will place a copy of the message 110B in queue 108 for delivery to subscriber S2 104.

A very similar procedure is performed for message 111 with a topic of /Animals/Tigers. In the case of message 111, there are no local subscribers with a matching interest connected to message delivery router 101 however; both subscribing clients S2 104 and S3 105 connected to downstream message delivery router 102 have registered matching interests. Message delivery router 101 will detect a matching interest for subscribing clients connected to the downstream message delivery router 102 and will place a copy of message 111 into queue 106 for delivery to message delivery router 102. Upon receiving a copy of message 111 downstream message delivery router 102 will perform its own matching process and will detect matching interests for subscribing clients S2 104 and S3 105. Upon detecting matching interests message delivery router 102 will place a copy of the message 111B in queue 108 for delivery to subscriber S2 104 and a copy of the message 111A in queue 109 for delivery to subscriber S3 105.

The level of service provided by the network of FIG. 1 is reliable, also known as best effort; meaning that if either of the message delivery routers 101, 102 becomes congested it may choose to discard messages as a method of relieving congestion. Prior art message delivery systems may set a flag in the header of the next message placed in a subscriber queue 107-109 after a message from that queue was discarded to indicate to the subscriber that one or more messages was lost. This method has some limitations for example queues that are destined for other message delivery routers contain messages for more than one subscribing client such as queue 106 in FIG. 1. When a discard occurs, the discard flag is set on the next message in queue 106, which may be destined for delivery to a different set of clients (subset or superset) than the discarded message. As a result, setting the discard flag for messages from queue 106 is meaningless to the downstream message delivery router 102. Therefore, prior art systems typically do not set the discard flag when messages are discarded from queue 106. The result is that the discard flag will not be set for messages sent to subscribing clients connected to the downstream message delivery router 102 and subscribing clients 104, 105 connected to the downstream message delivery router will be unaware that messages were discarded by an upstream message delivery router on flows that they are subscribed to. A second limitation of the prior art method is in the case where a subscribing client is interested in more than one topic; in this case the subscriber queue will contain messages with more than one topic. An example of a subscriber queue containing messages with more than one topic is subscriber queue 108 containing messages for subscribing client S2 104. Subscriber queue 108 contains messages with topic /Animals/Lions and /Animals/Tigers. If a message in subscriber queue 108 was discarded, message delivery router 102 could set the discard flag in the header of the next message placed in queue 108 to indicated to the subscribing client 104 that messages were discarded but the subscribing client would not be able to detect which topic(s) the discarded message(s) were for.

Using the techniques of the present invention, when a message is discarded the discarded message is replaced in a queue by a special discard indication message that contains only the topic of the discarded message. Typically, with the present invention, more than one message would be discarded when congestion is detected, to make room in the queue for newly arrived messages, in which case the discard indication message would contain the topic of each of the messages that was discarded. The discard indication messages would themselves be tagged as discard ineligible meaning that they should not be discarded by any downstream routers. The discard indication messages in a subscriber queue would be delivered to subscriber clients so that the subscribing client could use it to determine the topic(s) of the message(s) that were discarded. If messages are discarded from a queue containing messages destined for subscribing clients connected to a downstream message delivery router then the discard indication message will be delivered to the downstream message delivery router. Upon receiving a discard indication message a message delivery router will remove the topic(s) contained within and match them to subscription interests of downstream and local subscribing clients. The discard indication message will be placed in queue to any destinations detected during the matching process.

Figure 2:
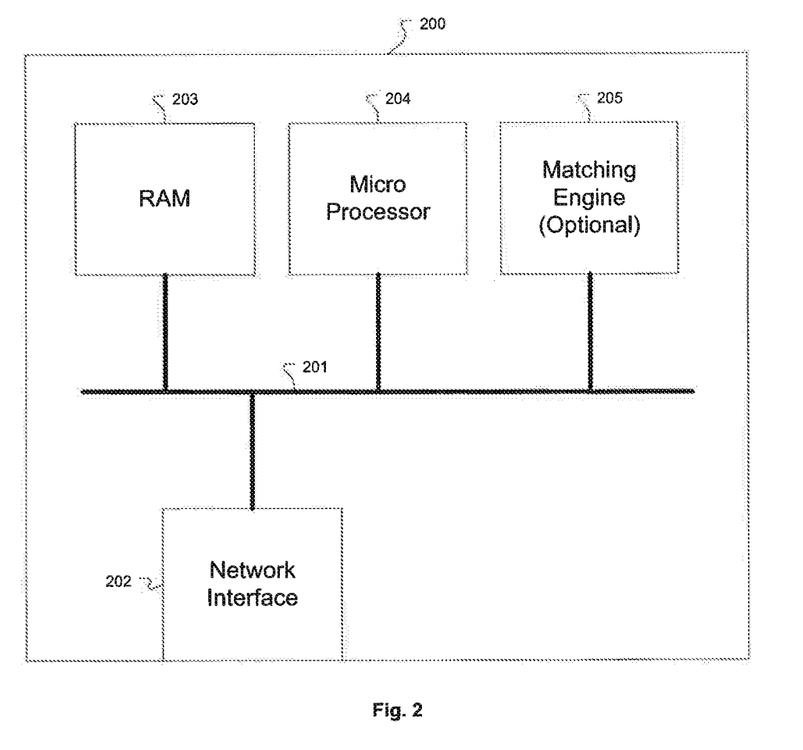
FIG. 2 shows a block diagram of a message delivery router.

FIG. 2 shows an example implementation of a message delivery router 200. In the example implementation there is a network interface 202, used by the message delivery router 200 to communicate with publisher or subscriber client systems. The network interface 202 implements a standard networking protocol such as Ethernet or Infiniband; messages received from publishing clients or sent to subscribing clients must pass through the network interface 202. Any communication received from a client must traverse the system bus 201 and be placed in random access memory or RAM 203, as it is known in the art. The system bus 201 is a communication path inside the message delivery router 200 for which many protocols exist and are well known in the art. The system bus 201 could be implemented using PCI express or other protocol or a combination of different bus protocols connected by components know in the art as bridges and switches. Any communications to or from a client must exist in RAM 203 and is transferred to or from the network interface 202 by direct memory access or DMA as it is known in the art. Communication from clients such as messages from publishing clients once in RAM 203 can be inspected by a micro processor 204. The microprocessor 204 is shown as a single entity however, there may be multiple microprocessors present in the system, each of which may contain multiple processing cores. The microprocessor 204 is responsible for receiving all stimuli from clients and generating all responses. The optional matching engine 205 is a hardware engine designed to offload the microprocessor 204 of the task of matching. In many implementations the matching is performed by the microprocessor 204. Message delivery systems deliver messages received from publishing clients to subscribing clients that have indicated an interest in receiving messages that match a certain criteria. In many implementations the publishing clients add a meta-data topic to the message; this topic is compared by the message delivery system 200 to interests that it has collected from subscribing clients in a process called matching. The process of matching can be an onerous task when there are large topic sets and large numbers of interests. In these situations the application of a hardware engine designed specifically to perform the task such as the matching engine 205 can enhance system performance.

The techniques of the present invention will be further described by the following examples with reference to FIG. 1. In the first example messages will be discarded from subscriber queue 107. Publishing client P1 100 sends a message 110 with a topic of /Animals/Lions to the message delivery router 101. The message delivery router 101 matches the message topic to interests collected from subscribing clients 103-105. Matching interests are detected for locally connected subscriber S1 103 and remote subscribing clients connected to downstream message delivery router 102. Based on the matching interests detected a copy of the message 110 must be placed in queue 106 for delivery to subscribing clients connected to the downstream message delivery router 102 and in queue 107 for locally connected subscribing client S1 103. Upon trying to place a copy of the message 110 in queue 107 the message delivery router 101 detects congestion. In order to relieve this condition the message delivery router 101 must discard one or more messages from the congested queue 107. In a typical implementation a message delivery router would discard the oldest messages in the queue to relieve congestion; however the techniques of the present invention can be applied to messages discarded from any position in the queue. Within the scope of the present invention the message delivery router 101 may use any method to determine how many messages it needs to discard in order to relieve the congested condition. For example the message delivery router may choose to discard the newest messages in the queue or may choose to discard messages from random locations or if the queue contains messages with more than one topic the message delivery router may choose to discard all messages with a topic that matches the current message. In discarding the messages the message delivery router 101 generates a discard indication message containing the topics of the discarded messages. The discard indication message replaces the discarded messages in queue 107 to be delivered to subscribing client S1 103. When the discard indication message is delivered to the subscribing client S1 103, the subscribing client S1 103 will inspect any topics included in the message to see exactly which topic flows experienced message loss. As an optimization to conserve resources the message delivery router 101 may choose to only include unique topics in the discard indication message. In the present example queue 107 contains only messages with topic /Animals/Lions and if the message delivery router choose to discard more than one message from queue 107 of the same topic (/Animals/Lions), the resulting discard indication message would only contain a single topic. As a further optimization the discard indication message could also contain a count associated with each unique topic indicating how many messages with this topic were discarded.

In the second example messages will be discarded from queue 106 containing messages destined to subscribing clients connected to downstream message delivery router 102. Note that queue 106 contains messages destined for subscribing clients S2 104 and S3 105 connected to downstream message delivery router 102 and will contain messages with topic /Animals/Lions and /Animals/Tigers. Publishing client P1 100 sends a message 111 with a topic of /Animals/Tigers to message delivery router 101. The message delivery router 101 matches the topic of the message to interests collected from subscribing clients 103-105; detecting matches to interests from subscribing clients S2 104 and S3 105 connected to downstream message delivery router 102. Upon detecting the matching interests the message delivery router attempts to place a copy of the message 111 into queue 106 containing messages destined to the downstream message delivery router 102. Message delivery router 101 is currently experiencing congestion and must take action to relieve the condition by discarding messages from queue 106 which with the addition of the new message 111 has exceeded its maximum depth threshold. In discarding messages the message delivery router 101 as in the previous example will generate a discard indication message and place the topics of the discarded messages in it. The discard indication message will replace the discarded messages in queue 106 and will be delivered to downstream message delivery router 102. The discard indication message will be marked as discard ineligible so the message will not be discarded by downstream message delivery router 102 if it too is congested. Upon receiving the discard indication message downstream message delivery router 102 will extract any topics contained within and match them to interests collected from subscribing clients 103-105; for any matching interests detected a copy of the discard indication message will be enqueued to those destination that registered the matching interest. In the present example queue 106 contains messages with topics /Animals/Lions and /Animals/Tigers and for the purposes of the present example it is assumed that messages with both topics were discarded by the upstream message delivery router 101. The topics contained in the discard indication message are /Animals/Tigers and/Animals/Lions. Topic /Animals/Tigers matches subscription interests for subscribing clients S2 104 and S3 105, and so a copy of the discard indication message will be placed in queues 108-109. Subscribing client S2 104 also has a matching subscription for /Animals/Lions however the discard indication message previously placed in queue 108 already has the topic /Animals/Lions in it and it is not necessary to enqueue a second copy of the discard indication message. When delivered to the subscribing clients S2 104 and S3 105 the discard indication message will indicate that messages with topics /Animals/Tigers and /Animals/Lions were discarded; in this case by an upstream message delivery router 101.

As an optimization in cases where multiple topics are contained in the discard indication message, the message delivery router could modify the content of the individual copies of the discard indication message(s) placed in the subscriber queue(s) to only contain topics for which that subscribing client had indicated a matching interest. In the previously described second example the discard indication message placed in queue 109 contained topics /Animals/Tigers and /Animals/Lions even though subscribing client S3 105 is only interested in receiving messages of topic /Animals/Tigers. The copy of the discard indication message placed in queue 109 could be modified to contain only topic /Animals/Tigers for which subscribing client S3 105 has registered an interest.

Another possible optimization is in the case where the message delivery router decided that it must discard additional messages from a queue before it has delivered the previous discard indication message. In this case the message delivery router could discard additional messages and instead of creating a new discard indication message it could amend the previous one as if all the message discards were completed in a single operation.

Figures 3, 3E:
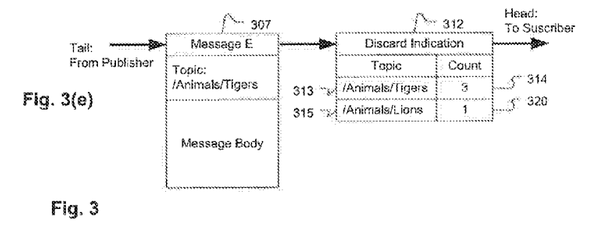
FIG. 3 shows series of queue states as the queue becomes congested and messages are discarded.
Figure 3A:
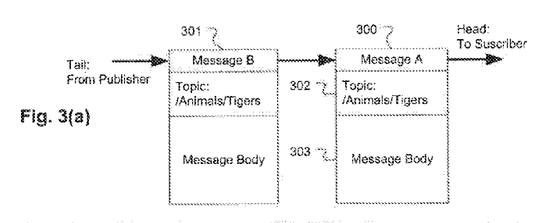
Figure 3B:
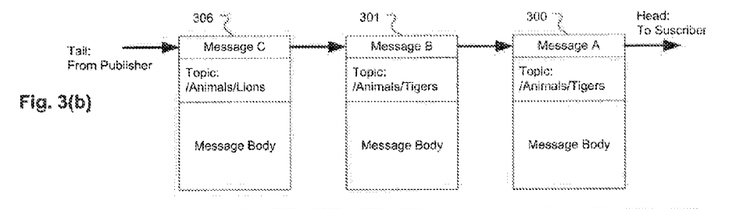
Figure 3C:
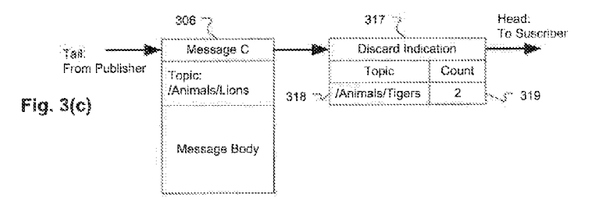

FIG. 3 shows an example queue that is experiencing congestion. As new messages are added to the queue it becomes necessary to discard messages and insert a discard indication message or amend an existing discard indication message. FIG. 3(a) describes a state of the queue in which it has two messages, message A 300 and message B 301. Both messages 300, 301 have the same topic 302, /Animals/Tigers. In addition to a topic 302, each message has a message body 303. For illustrative purposes the queue has a maximum depth of two messages; in most real applications the queue depth would be much larger. FIG. 3(b) describes a state of the queue where a third message C 306 has arrived and been added to the queue. At this point the queue is congested because its maximum depth of two has been exceeded and some action will be required to relieve the congested condition. In order to relieve the congestion the message delivery router discards message A 300 and message B 301. In the present example the message delivery router chooses to discard the two oldest messages in the queue (or from the head). Within the scope of the present invention the message delivery router could choose to discard as many messages as deemed necessary to relieve the congestion and from any location in the queue. The resultant state of the queue is shown in FIG. 3(c). In place of the two discarded messages 300 and 301 is a discard indication message 317. The discarded messages 300 and 301 both had the same topic. /Animals/Tigers and so the discard indication message lists only one topic 318/Animals/Tigers. The discard indication message 317 also contains an optional count field 319 associated with each topic. The count field 319 is a count of how many message with that topic were discarded. In the present example, queue state as depicted in FIG. 3(c) the count field 319 of discard indication message 317 indicates that two messages with topic 318/Animals/Tigers were discarded.

Figure 3D:
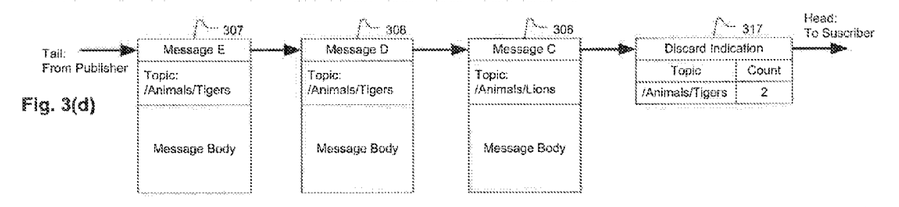

FIG. 3(d) depicts the state of the queue after two additional messages 307, 308 have been added to the queue. The maximum depth of the queue has once again been violated and the message delivery router must take action to relieve the congestion condition. Once again the message delivery router chooses to discard the two oldest messages in the queue. Message C 306 has a topic of /Animals/Lions and message D 308 has a topic of /Animals/Tigers. The discard indication message 317 from the previous discard operation has not yet been delivered and remains in the queue; the message delivery router may choose to amend the existing discard indication message 317 rather than creating a second. The resultant state of the queue is depicted in FIG. 3(e). The queue now contains one message 307 and a modified discard indication message 312. The discard indication message 317 (depicted in FIG. 3(d)) has been modified to reflect the newly discarded messages; the modified version is shown as 312 in FIG. 3(e). Discarded message C 306 had topic /Animals/Lions which did not previously exist in the discard indication message 312 (as shown in the previous state of FIG. 3(d)) necessitating the addition of a second topic entry 315. Associated with the topic entry 315/Animals/Lions is the optional count field 320 with a value of one, indicating that a single message with topic /Animals/Lions was discarded. Message D 300 was also discarded with a topic of /Animals/Tigers. Topic /Animals/Tigers was present in the discard indication message 317 of the previous queue state (depicted in FIG. 3(d)). As such, it does not need to be added again. Instead, the count field 314 is updated to three from the previous value of two indicating that an additional message with topic /Animals/Tigers was discarded.

The previously described discard indication message format does not convey any information about the order of arrival of the discarded messages. Other discard indication message formats are possible within the scope of the present invention for example if the order of arrival of the discarded messages was important to the subscriber applications then the topic of every message discarded could be included in the discard indication message in the order in which the discarded messages arrived. In the previously described method only unique topics were included in the discard indication message and a count field was used to indicate how many messages with that topic were discarded. If applications only care which topics experienced message loss and not how many messages were discarded then the count field can be omitted as an additional space savings.

Figure 4:
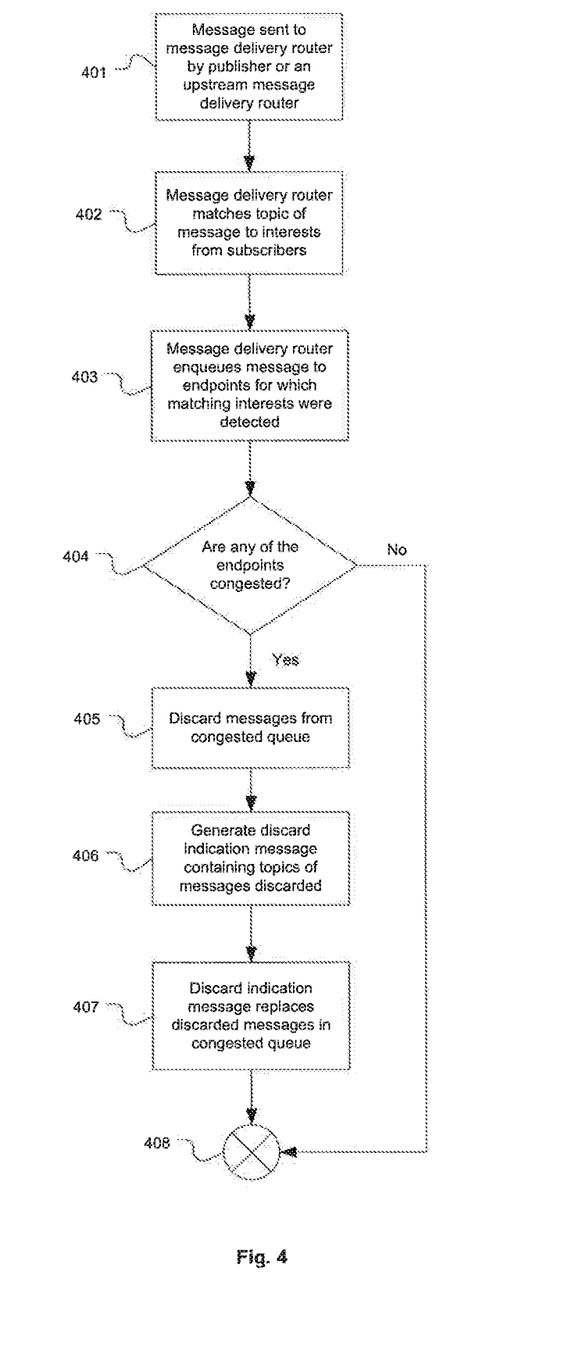
FIG. 4 shows a flow chart describing the process of generating a discard indication message.

FIG. 4 is a flow chart that describes the processing that takes place on a message delivery router after receiving a new message from a publishing client or from an upstream message delivery router. Processing starts at step 401 when the message delivery router receives a new message. In step 402 the message delivery router extracts the topic from the message it just received and matches it to subscriber interests. For each subscriber interest that matched a copy of the message is enqueued to the endpoint associated with the matching interest at step 403. In the description of the present invention it is assumed that the queues are implemented as link lists however other queue structures are possible. With a linked list implementation it is possible to add anew link to the queue even if the queue is at its maximum length; subsequent operations such as discarding messages are used to return the queue to a state where it is not exceeding its maximum length. With some other queue implementations such as a hardware FIFO it is not possible to exceed the maximum depth and it would be necessary to free up space in the queue before the new message could be added. Note that the subscriber associated with a matching interest may be a downstream message delivery router if the subscriber is not locally connected the selected queue will be a queue leading to a downstream message delivery router. In the case a copy of the message will be placed in queue to a downstream message delivery router, the message is only queued once for all downstream destinations which may be multiple subscribing clients or other further downstream routers. As the message delivery router is placing a copy of the message into queue, it will check to see if it is experiencing congestion in step 404. If the queue is experiencing congestion then in step 405 the message delivery router will discard one or more messages to relieve the congestion. In step 406 a discard indication message will be generated containing the topics of the messages that were previously discarded in step 405 or optionally an existing discard indication message already in the queue may be amended to include information about the newly discarded messages. The discard indication message will replace the discarded messages in queue in step 407. Note that the message delivery router may detect multiple queues that are experiencing congestion in which case it may be necessary to repeat steps 405-407 for each congested queue. If the endpoint is not found to be congested at step 404 then proceed directly to the end of the process at step 407.

Figure 5:
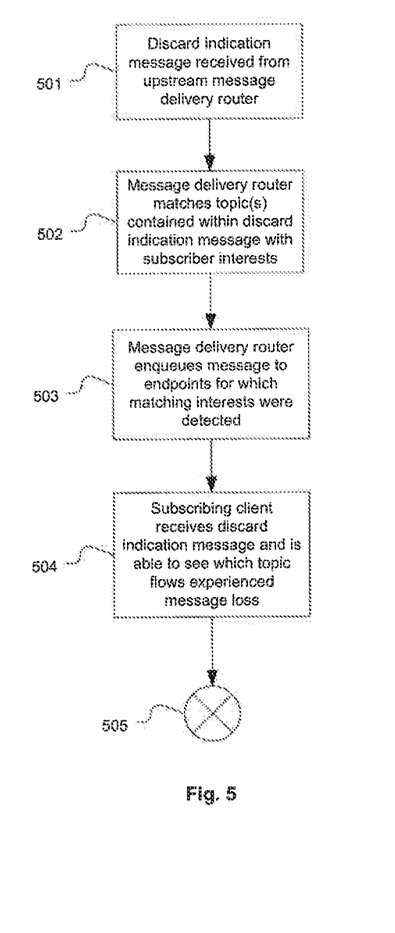
FIG. 5 shows a flow chart describing the processing of a discard indication message.

FIG. 5 is a flow chart that describes the processing that takes place on a downstream message delivery router upon receiving a discard indication message from an upstream message delivery router. Starting at step 501 where the downstream message delivery router receives a discard indication message. At step 502 the downstream message delivery router extracts the topic(s) from the discard indication message and matches them to subscriber interests in a process similar to that of matching a newly published message. Note that a discard indication message may contain multiple topics if the upstream message delivery router chose to discard multiple messages. For any matching subscriber interests that are detected a copy of the discard indication message is placed in the queue associated with the matching interest at step 503. Optionally at step 503 the message delivery router could modify copies of the discard indication message to contain only topics that are of interest to the subscriber associated with the queue to which the copy of the discard indication message is added. At step 504 a copy of the discard indication message is sent to the subscribing client who may use the discard indication message to determine exactly which topic flows have experienced message loss. Note that if the downstream message delivery router is also an upstream router to other further downstream route (s) then matches may be detected in step 502 that are for subscriber endpoints connected to another router. In this case processing of the discard indication message proceeds as described in FIG. 4 step 403 for these endpoints. Processing completes at step 505.

It will be appreciated by persons skilled in the art that many variants of the invention are possible.

It should be appreciated by those skilled in the art that any block diagrams herein represent functional blocks of illustrative circuitry embodying the principles of the invention, which may in practice be implemented in software modules using digital signal processing techniques.

For example, the invention may be implemented in a processor through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included.

All references mentioned above are herein incorporated by reference.

I claim:

1. A method of managing congestion in a message delivery system wherein messages containing a topic portion defining a topic and a body portion containing information relating to the defined topic are delivered to subscribers based on the topics associated with the messages, comprising:
   placing the messages in a queue for delivery to downstream equipment;
   in the event of congestion in the message delivery system, discarding one or more of said messages in the queue; and
   replacing the discarded messages with one or more discard indication messages indicating that one or more of said messages have been discarded, said discard indication messages containing the topics associated with discarded messages without the corresponding body portions, and said discard indication messages being flagged as discard ineligible to prevent their discard by downstream equipment; and
   receiving at the downstream delivery equipment discard indication messages;
   matching each of the topics contained within said received discard indication messages to subscribers; and
   forwarding a copy of the discard indication messages to subscribers that match the topics contained in the discard indication messages.

2. A method as claimed in claim 1, wherein each said discard indication message contains a field indicating the number of messages discarded for the topic contained therein.

3. A method as claimed in 1, further comprising:
receiving discard indication messages at a subscriber, and
determining at the subscriber from the received discard indication messages which topics have discarded messages.

4. A method as claimed in claim 1, wherein when any said discard indication messages received at the downstream equipment containing more than one topic match particular subscribes, said discard indication messages are modified prior to delivery to remove any topics not matching the particular subscribers.

5. A router for use in a message delivery system wherein messages contain a topic portion defining a topic and a body portion containing information relating to the defined topic are delivered to subscribers based on the topics associated with the messages, comprising:
a queue for enqueing received messages for delivery to downstream equipment for delivering the messages to the subscribers; and
a processor configured, in the event of congestion in the message delivery system, to:
discard one or more of said messages from said queue; and
replace the discarded messages with one or more discard indication messages indicating that one or more of said messages have been discarded, said discard indication messages containing topics associated with discarded messages without the corresponding body portions of the messages, and said discard indication messages being flagged as discard ineligible to prevent their discard by the downstream equipment.

6. A router as claimed in 5, wherein the downstream equipment comprises local subscribers.

7. A router as claimed in 5, wherein the downstream equipment comprises a downstream message delivery system.

8. A router as claimed in claim 5, wherein said processor is configured to populate a field in each said discard indication message with data indicating the number of messages discarded for the topic contained therein.

9. A method of managing messages at a downstream delivery system for messages subject to discard by an upstream delivery system, comprising:
receiving at the downstream delivery system discard indication messages indicating that one or more of said messages have been discarded, said discard indication messages containing topics associated with messages discarded by the upstream without corresponding body portions thereof, and said discard indication messages being flagged as discard ineligible;
matching each of the topics contained within said received discard indication messages to subscribers; and
forwarding a copy of the discard indication message to subscribers that match the topics contained in the discard indication messages to notify the subscribers which topics are associated with messages discarded by the upstream delivery system.

10. A method as claimed in claim 9, further comprising receiving discard indication messages at said subscribers that match the topics contained in the discard indication messages, and
determining at the subscribers from the received discard indication messages which topics have discarded messages.

11. A method as claimed in claim 9, wherein when any said discard indication messages received at the downstream delivery system containing more than one topic match particular subscribers, said discard indication messages are modified prior to delivery to remove any topics not matching the particular subscribers.

12. A method as claimed in claim 9, further comprising matching each of the topics contained within said received discard indication messages to one or more further downstream delivery systems attached to subscribers interested in said topics; and
forwarding a copy of the discard indication messages to said one or more further downstream delivery systems for delivery to said subscribers.

13. A non-transient storage medium storing instructions for managing congestion in a message delivery system wherein messages containing a topic portion defining a topic and a body portion containing information relating to the defined topic are placed in a queue for delivery to downstream equipment for delivering the messages to subscribers based on the topics associated with the messages, said instructions when executed on the processor and in the event of congestion in the message delivery system causing the processor to:
discard one or more of said messages from said queue; and
replace the discarded messages with one or more discard indication messages indicating that one or more of said messages have been discarded, said discard indication messages containing the topics associated with discarded messages without the corresponding body portions of the messages, and said discard indication messages being flagged as discard ineligible to prevent their discard by the downstream equipment.

* * * * *